June 9, 1959  W. M. McILWAINE  2,889,840
AWNING FRAME STRUCTURE
Filed Jan. 4, 1957
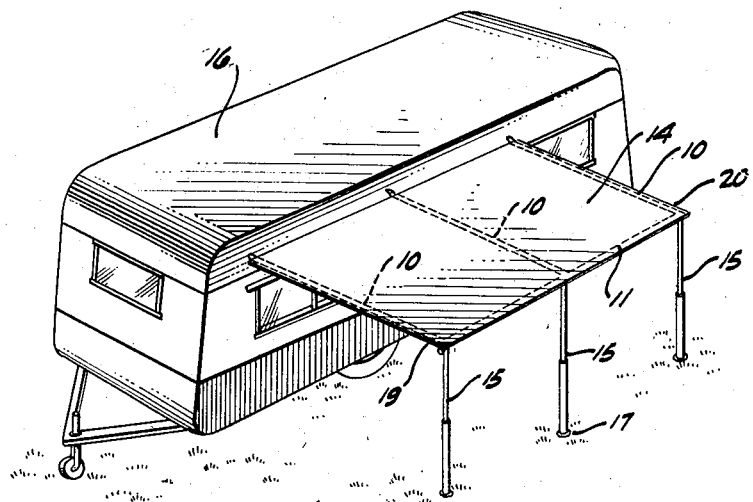
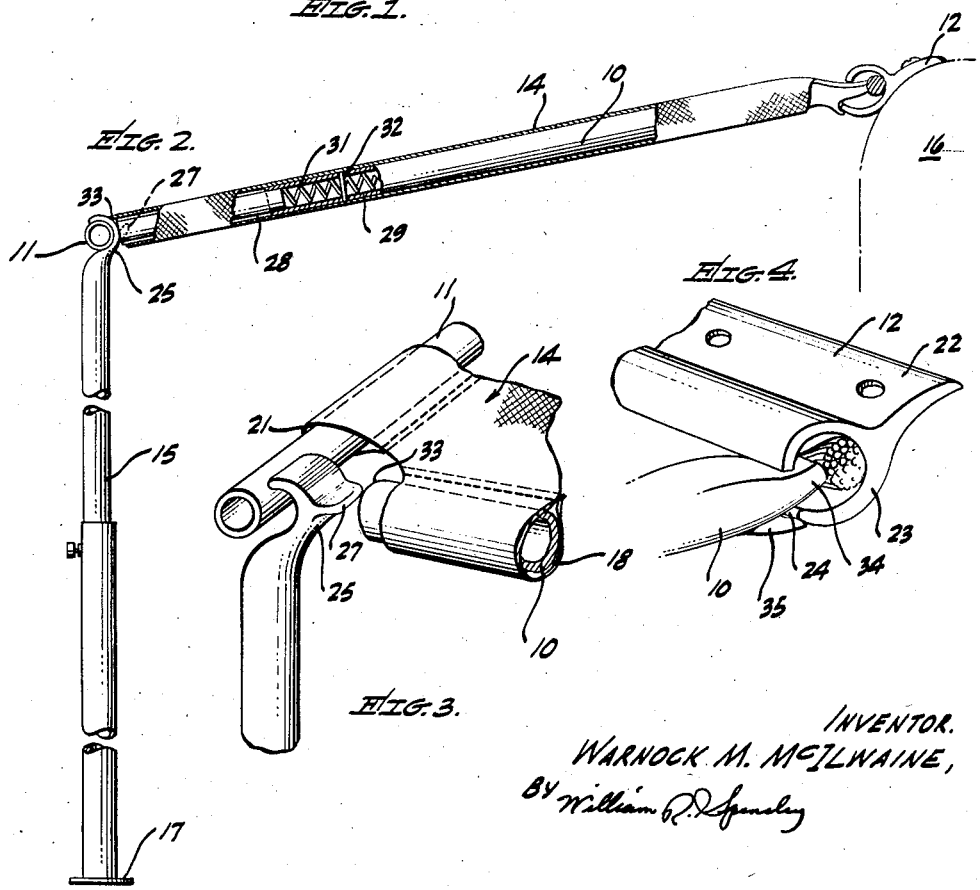
INVENTOR.
WARNOCK M. McILWAINE,
BY William R. Spensley
ATTORNEY.

United States Patent Office 2,889,840
Patented June 9, 1959

2,889,840

AWNING FRAME STRUCTURE

Warnock Montgomery McIlwaine, San Pedro, Calif.

Application January 4, 1957, Serial No. 632,521

1 Claim. (Cl. 135—7.1)

This invention relates to awning construction and more particularly to an improved frame structure for detachable awnings.

Although not limited thereto, the awning construction of the present invention is particularly adapted for use with awnings for house trailers and accordingly will be particularly described in connection with such an installation.

Awnings are commonly used with house trailers today, particularly where the house trailer is used as a stationary residence. In the present state of the art these awnings consist most generally of a framework of tubular elements which form a support for a suitable sheet of awning material. Collapsible awning constructions of the type in use on buildings for many years are not suitable for use with trailers, primarily due to the fact that such awnings impose a severe load upon the wall upon which they are mounted and such a load is too great for the wall of most trailers. In the most common type of construction for house trailer awnings the load is taken by the framework which is supported by vertical members positioned on the ground adjacent the trailer. The awning material is supported by rafters which extend outwardly from the wall of the trailer and which are connected at their outer end by a horizontal member to which the awning material is usually fastened. The horizontal member and connected rafters are in turn supported by the vertical members. Ease of assembly and disassembly of the awning are primary considerations in house trailer awnings since they must be contractible to protect them from the elements and to allow movement of the trailer. In the present state of the art the various supporting members are generally connected by standard fittings such as elbows and T's or by bolted clamps. Such fittings and construction make assembly and disassembly difficult since the vertical members, rafters and horizontal members carrying the awning must be positioned while the various threaded or bolted fittings are assembled.

Accordingly, it is an object of the present invention to provide an improved frame structure for a detachable awning which allows ease of assembly and disassembly of the awning.

It is another object of the present invention to provide an improved awning construction for house trailers which allows proper support and tensioning of the awning material.

It is a further object of the present invention to provide an improved awning frame structure which allows increased economy and interchangeability of manufactured parts.

In accordance with the present invention, an awning frame structure is provided in which the horizontal member to which the awning material is affixed is mateable with and supported by the vertical member when an outward force is exerted upon the vertical member by a rafter.

The novel features which are believed to be characteristic of the invention, both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

Fig. 1 is a perspective view of one form of awning supporting frame embodying the present invention shown in an assembled house trailer awning;

Fig. 2 is an enlarged partial view of the framing with parts shown in section;

Fig. 3 is an enlarged fragmentary view in perspective of the fittings corresponding to Fig. 2; and Figure 4 is an enlarged fragmentary view similar to Figure 3 showing the fittings of Figure 2 at the end of the rafter opposite to those shown in Figure 3.

Referring now to the drawing wherein like reference characters designate like or corresponding parts throughout the several views, there is shown a supporting frame in accordance with the present invention used in conjunction with a house trailer awning sheet of the type commonly known to the art.

The awning frame structure of the present invention includes generally a plurality of rafters 10, a horizontal frame member 11, a rail 12, an awning sheet 14, and a plurality of substantially vertical support members 15. The awning sheet 14 of flexible material is disposed over the rafters 10 and horizontal members 11 and 12 in such a way that the awning sheet extends outwardly in the form of a canopy from the structure to be shaded, such as the trailer 16. The vertical members 15 extend substantially vertically from the ground to support the canopy by engaging the horizontal member 11. A footing 17 or other ground engaging member is formed at the lower end of each vertical supporting member 15.

In the presently preferred embodiment of the invention the awning sheet 14 is affixed to the horizontal members and rafters by means well known to the art such as pockets 18 sewn to the awning sheet material through which each of the respective frame members may be inserted. That is, in the illustrative embodiment shown in which three rafters are used, a transverse pocket is formed proximate the transverse edges 19, 20 of the awning sheet and proximate center of the awning through which the rafters 10 extend. The horizontal member 11 extends through the longitudinal pocket 21 provided proximate the outer edge of the awning sheet 14 to affix the awning sheet thereto. The outer edge of each transverse pocket 18 is sufficiently spaced from the outer edge of the awning sheet to allow access to each rafter.

The awning sheet is affixed to the rail 12 which is in turn affixed to the wall or roof of the trailer by any of the means well known to the art. For example, the rail 12 affixed to the wall of the trailer is of conventional construction with an attaching flange 22 and a section of substantially circular cross-section 23 to provide a longitudinal channel. A slot 24 in the circular channel 23 of the rail 12 is adapted to receive one edge of the awning sheet, and by securing a rope or cable in the edge the edge is beaded and can be detachably secured within the channel of the rail 12.

In accordance with the present invention, a bracket 25 which is open on one side and mateable with the horizontal member 11 is formed at the upper end of each vertical member 15. The bracket is formed to provide a horizontal support and a transverse support in the inward direction for the horizontal member 11 when the member 11 is in position in the bracket. That is, referring to Figs. 2 and 3, in the presently preferred embodiment a deep C-shaped bracket 25 is formed at the upper end of the vertical member 15 with the C-bracket having an inner radius of curvature substantially equal to the outside radius of the horizontal member 11. Thus, with the horizontal member in place in the bracket 25 movement of the member 11 is restrained in all directions except to the left in Fig. 2 which is the direction away from the trailer in an assembled installation. The bracket may be separately formed and affixed to the vertical member 15 or may be formed as an integral part thereof. Although a C-shaped bracket is shown and described in the presently preferred embodiment other configurations which furnish support for the horizontal member 11 in the vertical direction and in the transverse direction of the force created by the tension of the awning sheet 14 as described hereinafter may also be used.

A protrusion 27 is provided at the outer face of the bracket 25 as shown in Figs. 2 and 3. The length and configuration of the protrusion is dependent upon the rafters used in a given installation and is formed to provide a vertical support for the rafter about which the rafter may be rotated as described hereinafter.

The rafters 10 are of variable length tubular construction comprising two telescoping sections connected by spring tensioning means whereby the length of the rafter may be increased by rotating a first section 28 of the rafter with respect to the section 29. In the present construction a coil spring 31 is affixed to the inner telescoping portion of the rafter while a pin 32 is positioned through the outer telescoping section to provide variable length spring tensioning of the rafter when the inner section is rotated to advance the spring into or out of the outer section. The outer end 33 of each rafter is an open end carrying no fixtures or connectors. The inner end 34 is formed to mate with the rail such as to prevent rotation when in position on the rail. That is, in the presently preferred embodiment the end 34 of the rafter is flattened to a thickness less than the slot opening 24 of the channel but with a width greater than the height of the slot. Thus, when the inner end 34 is placed in the slot the second section 29 of the rafter cannot be rotated. Stops 35 are also formed on the flattened end to limit the depth to which the end enters the channel.

The protrusion 27 is mateable with the open end of the rafter such that the end 33 of the rafter is supported vertically and horizontally when the end 33 is butted against the bracket, although the rafter is free to rotate with respect to the protrusion. It is not necessary, however, that the protrusion conform in configuration to the circular configuration of the tubular rafter and the cross-sectional configuration of the protrusion may be substantially smaller than that of the rafter.

In assembly of the awning frame structure of the present invention a vertical member 15 is adjusted in height and location to receive the horizontal member 11. With the inner edge of the awning sheet affixed to the rail 12 the awning sheet is extended and the horizontal member is positioned in the bracket 23. The respective rafter 10 is positioned in the pocket with the inner end 39 in the channel slot 24. The first section 28 of the rafter 10 is rotated to elongate the rafter such that the outer end 33 of the rafter surrounds and rests upon the protrusion 27 and butts against the bracket 25. By further rotating the rafter section 28 an outward force is exerted upon the bracket 25 and the horizontal member 11 within the bracket. By exerting the outward force the awning sheet is tensioned and the horizontal member 11, vertical member 15, and rafter 10 are all maintained in position without further bolts or connectors. Similarly, the inner end of the rafter is held in place in the rail by the force exerted by the rafter against the rail 12.

Thus, the frame structure is firmly assembled and the awning sheet tensioned by forces created due to lengthening the rafters, and no additional connectors, clamps, or threaded connections are required. By lengthening the rafter one end 33 is forced against the bracket and the inner end 34 is forced into position with the rail 12. The oppositely acting force produced by the tension of the awning sheet acts upon the horizontal member 11 and the bracket into which it is positioned to firmly maintain the awning structure in assembled position.

The present invention, therefore, provides an improved awning frame structure which allows ease of assembly and disassembly, together with economy and interchangeability of manufactured parts.

What is claimed is:

An awning support frame for mounting an awning sheet extending from a structure comprising: a horizontal frame member, a plurality of transverse rafters and a plurality of vertical support members; said awning sheet being carried by said rafters and said horizontal member, means for affixing the inner edge of said awning sheet proximate said structure, said awning sheet having the inner edge thereof fixed to said affixing means, the outer edge of said awning sheet being affixed to said horizontal member; said plurality of vertical members being equal in number to said plurality of rafters, a bracket affixed to the upper end of each of said vertical members, said bracket being mateable with said horizontal member to furnish a vertical support for said member, said bracket defining an opening at the side away from said structure through which said horizontal member can be inserted; said rafters having an open tubular outer end; a male protrusion on the side of said bracket toward said structure, said protrusion being slidably engageable with the inner surface of said end of said rafter whereby said rafter is abutted against said bracket surrounding and supported by said protrusion, an inner end of said rafter abutted against said structure proximate said inner edge of said awning; and means for varying the length of said rafter to tension said awning sheet and retain said support frame in assembled position.

References Cited in the file of this patent

UNITED STATES PATENTS

| | | |
|---|---|---|
| 92,487 | Stockman | July 13, 1869 |
| 2,423,402 | Olsen | July 1, 1947 |
| 2,706,132 | Chaffin | Apr. 12, 1955 |

FOREIGN PATENTS

| | | |
|---|---|---|
| 149,282 | Switzerland | Nov. 2, 1931 |